T. J. ROCHFORD.
CLEANER FOR WINDOWS.
APPLICATION FILED DEC. 26, 1908.
944,245.
Patented Dec. 21, 1909
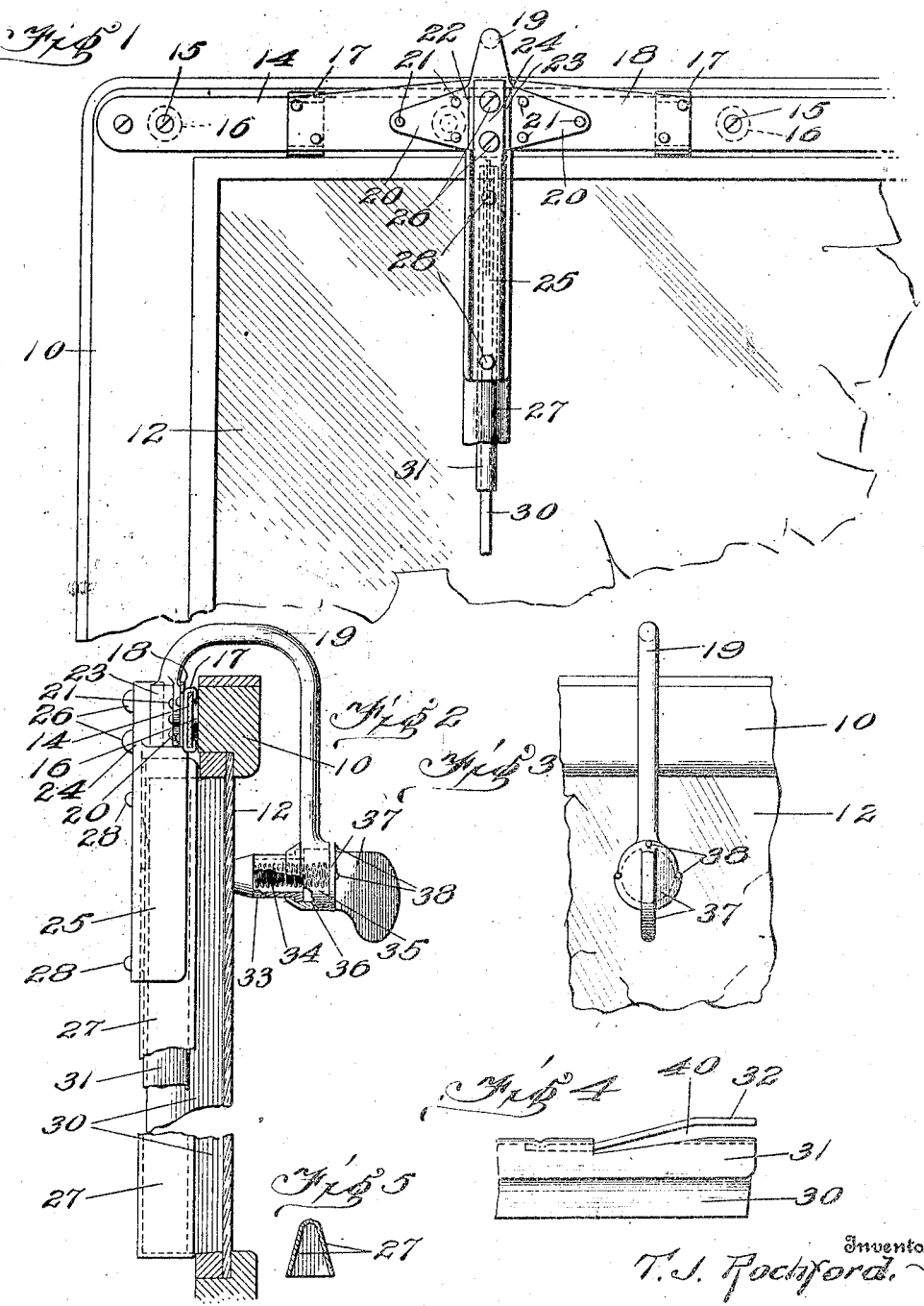

UNITED STATES PATENT OFFICE.

THOMAS J. ROCHFORD, OF CHICAGO, ILLINOIS, ASSIGNOR TO MARY BELL ROCHFORD, OF CHICAGO, ILLINOIS.

CLEANER FOR WINDOWS.

944,245.  Specification of Letters Patent.  Patented Dec. 21, 1909.

Application filed December 26, 1908. Serial No. 469,203.

*To all whom it may concern:*

Be it known that I, THOMAS J. ROCHFORD, a citizen of the United States, residing at Chicago, in the county of Cook and State of Illinois, have invented certain new and useful Improvements in Cleaners for Windows, of which the following is a specification.

This invention relates to improvements in window cleaners or wipers, and is particularly adapted for use in connection with automobile wind-shields, street car windows and the like.

The invention is illustrated in the accompanying drawings in which—

Figure 1 is a front elevation of a part of a wind-shield, with the device applied thereto; Fig. 2 is a side view, the wind-shield being shown in section; Fig. 3 is a rear view in detail of the operating lever or handle; Fig. 4 is a detail showing a spring pressing upon the wiper strip; Fig. 5 is a sectional detail of the holder for the wiper strip.

The device operates by movement from side to side, having a vertical wiper strip arranged to press against the front of the glass, and supported in position by a slide which travels on a track on the frame of the shield, and operated by means of a handle which extends over the upper edge of the shield and has a spring bearing against the back of the shield.

Referring specifically to the drawings, 10 indicates the frame of a wind-shield and 12 the glass thereof. Extending across the front of the top piece of the frame of the shield is a track consisting of a metal strip 14 held in place by countersunk screws 15, and with washers 16 behind the same to space the strip or track from the frame.

The slide which travels on said track consists of a thin, flat piece of metal 18 which is connected to the track by means of guides or clips 17 at opposite ends thereof, the upper and lower edges of these guide pieces being hooked over the upper and lower edges of the track. The strip 18 is provided at the middle thereof with a lever arm 19, attached to the strip by means of rivets 21 through ears 20 projecting from the front end of the arm. This part of the arm also has projecting lugs 22 and 23 between which the upper end 24 of a vertical piece 25 fits and is held in place by screws 26. The piece 25 is substantially V-shaped in cross section, and projects down a sufficient distance for the attachment of the holder 27 for the wiper strip, said holder consisting of a piece of folded sheet metal which is fastened at its upper end to the piece 25 by means of rivets 28, the upper end of the holder 27 fitting between the sides of said piece 25. The wiper consists of a strip 30 of rubber or similar material held between the side flanges of a folded metal strip 31 between which it fits snugly. These parts fit within the groove or between the sides of the holder 27, and are pressed at the back by means of springs 32 at each end, these springs being fastened at one end to the strip 31 and extending through an opening at 40 in the back of said strip and pressing against the holder 27 at the angle thereof. This permits the wiper strip 30 to swing from side to side as it is moved one way or the other across the face of the shield, to the extent permitted by the side flanges of the holder 27. The springs 32 also serve to press the strip 30 into contact with the glass.

The wiper as described is moved from side to side by the manipulation of the handle 19, the parts at the top which carry the strip and holder sliding along upon the track 14. It is at times desirable to move the wiper from one side to the other out of contact with the glass, and for this purpose the rear end of the arm or handle 19 is provided with a hollow 36 closed at one end by a combined cover and hand piece 37 held in place by screws 38. Within the hollow is a compression spring 34 which bears against a block 33 the front end of which is in contact with the rear face of the glass 12. The spring 34 by its pressure tends to swing the rear or lower end of the handle outwardly or rearwardly, which has the effect of pressing the wiper strip 30 against the face of the glass. To release said pressure and disengage the wiper strip from the glass the part 37 is pressed in or forwardly, compressing the spring 34, and turning the arm 19 so that the strip 30 is moved away from the glass, this action being permitted by the flexibility of the thin metal strip 18, which by the action described is twisted or distorted to allow the wiper to swing away from the glass. When the pressure on the part 37 is released the spring 34 throws the handle back and brings the wiper strip against the face of the glass as formerly. The lower end of the holder 27 is closed to prevent the wiper strip dropping down and out.

I claim:

1. A cleaner for windows or the like, comprising a wiper extending across one side of the window, a support to which the wiper is attached, a track on the window frame, on which said support is slidable, a handle rigidly connected to the wiper and extending around the frame of the window to the opposite side thereof and having a bearing against said opposite side.

2. A cleaner for windows or the like, comprising a track extending along the edge of the window, a flexible support slidable along said track, a holder extending across the window and connected at one end to said flexible support, to allow the holder to be swung away from the window, and a wiper strip held by said holder.

3. A cleaner for windows or the like, comprising a wiper strip holder extending across one side of the window, a handle attached to one end of said holder and bent around the edge of the window to the opposite side thereof, and having a spring-pressed member bearing against the last-mentioned side, and a flexible support for the holder, connected to the end thereof, and mounted for lateral movement upon a track extending along the edge of the window.

4. A cleaner for windows or the like, comprising a track extending along one edge of the window, spaced clips embracing said track and slidable along the same, a strip of thin flexible metal connecting the clips, a wiper holder, and a handle connected to said holder and strip.

In testimony whereof, I affix my signature in presence of two witnesses.

THOMAS J. ROCHFORD.

Witnesses:
NELLIE FELTSKOG.
H. G. BATCHELOR.